April 17, 1962   R. C. ALLEN ET AL   3,030,103
TOOL FOR HOLDING VEHICLE COMPONENTS
Filed April 13, 1960   3 Sheets-Sheet 2

Robert C. Allen
Glenn E. Engle
INVENTORS

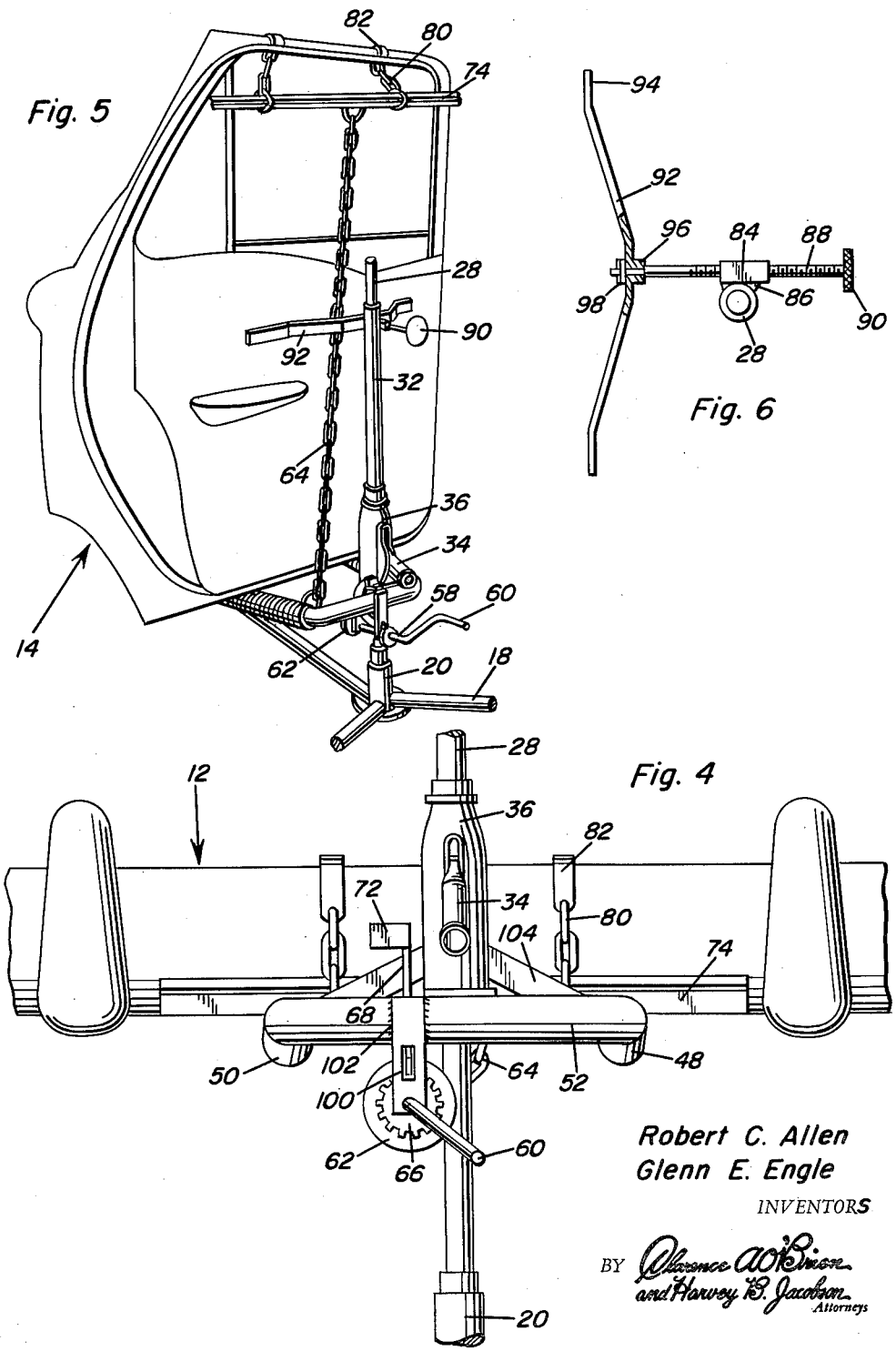

3,030,103
                                                                Patented Apr. 17, 1962

3,030,103
TOOL FOR HOLDING VEHICLE COMPONENTS
Robert C. Allen, Elkhart, and Glenn E. Engle, Bristol, Ind., assignors to Special Products Corporation, a corporation of Indiana
Filed Apr. 13, 1960, Ser. No. 22,020
4 Claims. (Cl. 269—17)

The present invention generally relates to that class of articles known as work holders for positioning an article of work while a certain operation is performed thereon. More particularly, the present invention relates to a tool or holder for securing or retaining vehicle body components in position during installation or removal.

One of the major problems in automobile repair shops and the like is the orientation of components in a desired position and maintaining such components in such a position while being installed. Therefore, it is the primary object of the present invention to provide a tool for accurately gripping and positioning vehicle components for retaining them in position for installation.

Another object of the present invention is to provide a tool for holding vehicle components while installing which is simple in operation, rigid in construction, adapted for use with vehicle doors, bumpers and the like, relatively inexpensive to manufacture and generally well adapted for its particular purposes.

A further object of the present invention is to provide a tool in accordance with the preceding objects in which the tool employs means for securingly clamping an object in place for ease of installation and positioning of such an object.

Yet another object of the present invention is to provide a tool for holding vehicle components such as doors or bumpers in accurate and positive position while installing thereby permitting such components to be properly positioned in relation to the remainder of an automobile with the tool being portable in nature and providing a clamp mechanism operated by virtue of a hand winch for securely clamping the components together with a jack mechanism for raising and lowering the components vertically thereby orientating the components properly for installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a view of the device of the present invention employed for holding a vehicle bumper;

FIGURE 5 is a perspective view of the tool of the present invention employed for holding a vehicle door;

FIGURE 6 is a component sectional view of the door engaging member illustrating the swivel connection thereof; and FIGURE 7 is a perspective view of the member having hooks thereon for engaging the upper edge of the vehicle component.

Figure 1:
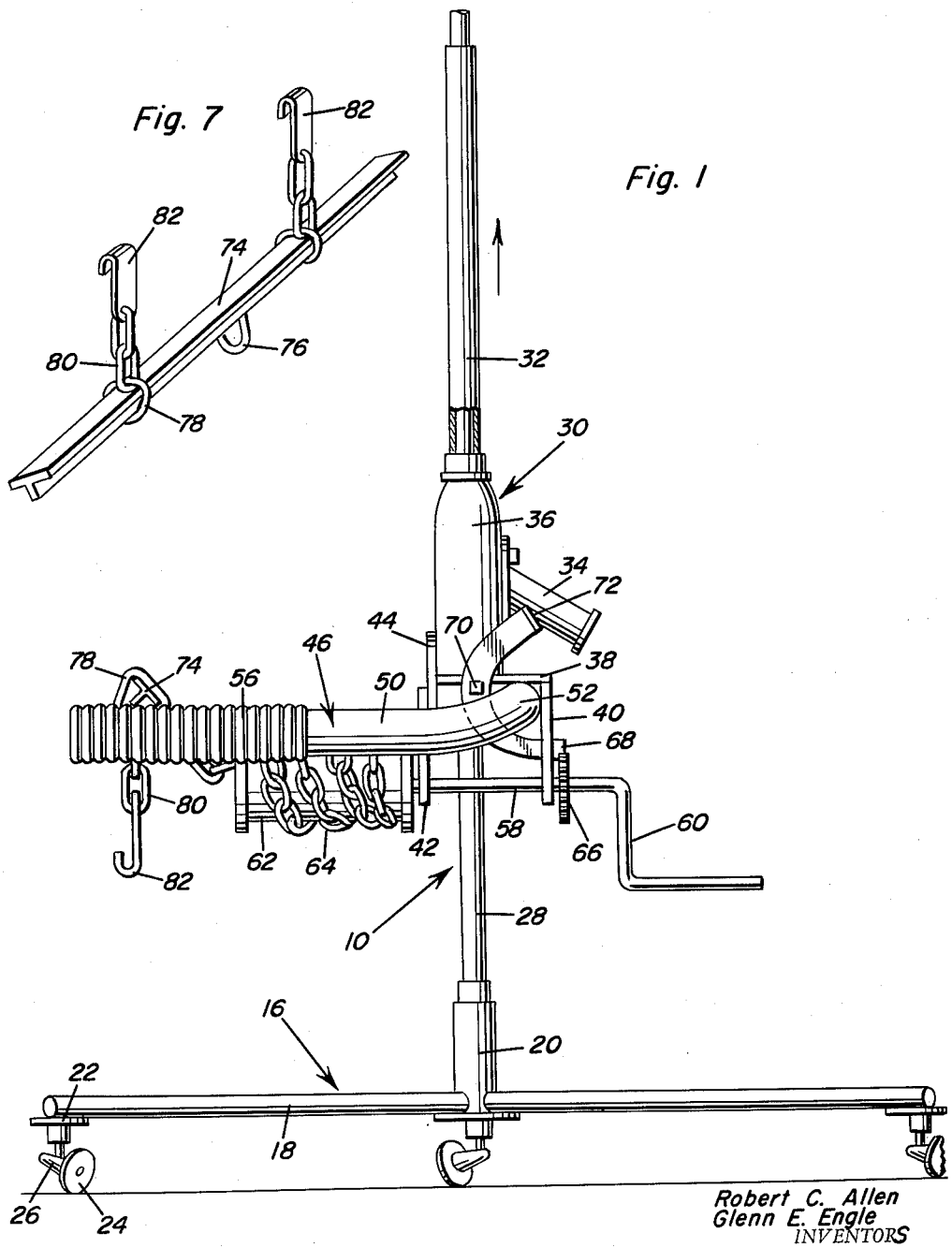
FIGURE 1 is a side elevational view of the tool of the present invention with portions thereof broken away for illustrating the structure.

Referring now specifically to the drawings, the numeral 10 generally designates the tool of the present invention for holding vehicle components such as a bumper generally designated by the numeral 12 or a vehicle door generally designated by the numeral 14 while such components are being installed so that they may be properly aligned and then accurately maintained in that position during installation.

The device of the present invention generally is in the form of a portable stand having a base generally designated by the numeral 16 and including radially extending tubular members 18 extending rigidly outwardly from a central tubular member or hub 20. At the outer end of each radially extending tubular member 18, there is provided a mounting bracket 22 for supporting a roller 24 on an inclined axis 26. This will enable the rollers to movably support the tool but will generally retain the device in position on a supporting surface.

Extending vertically upwardly from the central hub or tubular member 20 is a vertical standard 28 having a friction type bumper jack generally designated by the numeral 30 mounted thereon with a tubular sleeve 32 disposed on the standard 28 above the jack 30 so that the sleeve 32 may be rotated or removed independently of the jack 30. The jack 30 is provided with a tubular operating handle 34 whereby oscillation of the operating handle 34 in the conventional manner of a bumper jack will cause the bumper jack to move vertically on the standard 28. The bumper jack is modified to the extent that it actually has no projecting arm for engagement under a bumper but does include a tubular housing 36 of enlarged cross-sectional area whereby the operating handle 34 will elevate the housing 36 when it is pivoted in a vertical plane by virtue of engagement with the standard 28 in the conventional nature of a bumper jack.

Mounted rigidly on the bumper jack housing 36 is a transverse horizontal plate 38 having a pair of depending plates 40 and 42 rigid therewith and also a transverse plate 44 which is elongated. A rigid U-shaped member generally designated by the numeral 46 is supported by the bumper jack housing 36 and the U-shaped member 46 includes a pair of parallel legs 48 and 50 interconnected by a curved bight portion 52. The bight portion 52 extends under the plate 38 and engages the depending plate 40 while also engaging the ends of the transverse plate 44 which are welded thereto as indicated by reference numeral 54. Thus, the U-shaped member 46 is rigid with the jack housing 36 for movement therewith and the bight portion 52 is slightly curved upwardly in relation to the legs 48 and 50. The outer end of each of the legs 48 and 50 is provided with a covering or sleeve 56 of a corrugated or ribbed nature and this covering is preferably constructed of rubber, plastic or any other similar material and defines a plurality of circumferential ridges or ribs throughout the major portion of the length of the legs 48 and 50.

Figure 2:
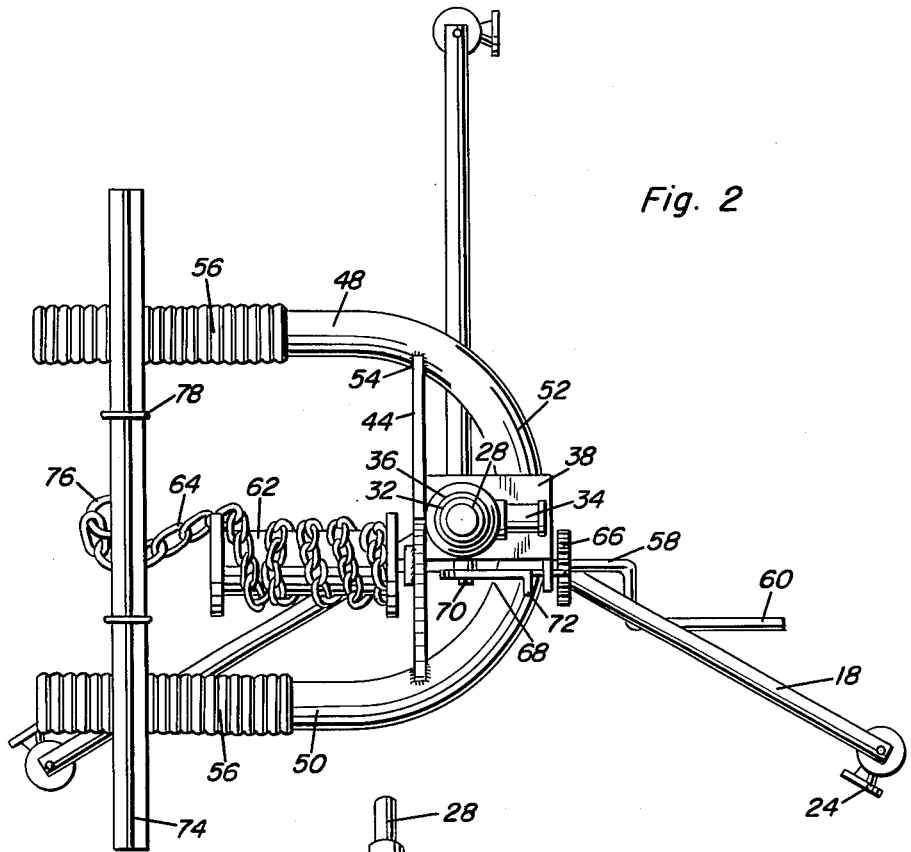
FIGURE 2 is a top plan view of the construction of FIGURE 1.

Rotatably journaled in the lower ends of the depending plates 40 and 42 is a shaft 58 having an offset handle 60 at one end thereof and a winch drum 62 at the other end thereof with the winch drum being disposed generally below the U-shaped member 46 and intermediate the legs 48 and 50 although offset toward the leg 50 as illustrated in FIGURE 2. Attached to the drum 62 is a chain 64 or similar flexible element whereby rotation of the handle 60 will effect rotation of the shaft 58, and drum 62 thereby effecting unwinding or winding of the chain 64 in relation to the drum.

Figure 3:
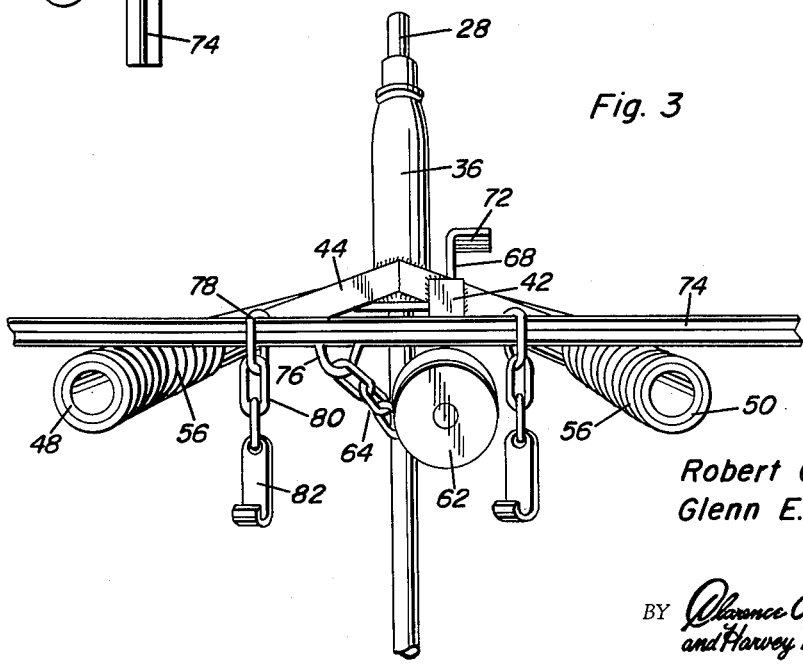
FIGURE 3 is a front view of the tool.

For locking the drum 62 in rotated position, the shaft 58 is provided with a ratchet gear 66 thereon outwardly of the plate 40 for engagement with an arcuate or semicircular ratchet member 68 pivoted on pivot bolt 70 and terminating at its upper end in an offset handle 72 for manipulation of the ratchet member 68. The handle 72 is generally disposed alongside of but spaced from the jack handle 34 as illustrated in FIGURES 1–3. By pivoting the ratchet member 68 about pivot bolt 70 in an obvious manner, the ratchet gear 66 may be engaged for locking the winch drum 62. Also, the arcuate configuration of the ratchet member 68 enables mounting of the ratchet member so that it curves under the bight portion 52 of the U-shaped member 46 whereby the bight portion 52 will form a stop for movement of the ratchet member 68 away from the ratchet gear 66.

The upper end of the chain 64 is connected to an elongated bar 74 which is T-shaped in cross-sectional configuration and provided with a centrally disposed rigid loop 76 on the bottom of the vertical flange which is connected with the chain 64. Disposed on the bar 74 is a pair of loops 78 each having a short chain 80 attached thereto with the chain 80 having a hook 82 connected thereto with the hooks being constructed of sheet material and having substantial width. The loops or rings 78 are movable on the bar 74 so that the hooks 82 may be orientated for engagement with different types of vehicle components.

The sleeve 32 is provided with a horizontally disposed internally threaded square block 84 adjacent the top thereof secured to the sleeve as by welding 86. An elongated threaded rod 88 extends through the block 84 and of course is adjustably connected thereto. One end of the threaded rod 88 is provided with a knurled knob or handle 90 while the other end is swivelly connected to a bridging plate 92 which has an inner concave area and an outer flat area designated by the numeral 94. The bridging bar is of resilient material such as flat metal strap stock or the like and the center of the bar 92 is provided with a hub 96 engaging a shoulder on the threaded rod 88 and retained against the shoulder by a removable pin 98 or the like thereby swivelly connecting the bar 92 to the rod 88.

It is pointed out that in FIGURE 4, the orientation of the lower end of the ratchet member 68 in relation to the vertical support plate 40 is shown with the support plate 40 having an aperture or slot 100 for receiving the end of the ratchet 68. Also note that the support plate 40 is welded to the bight portion of the U-shaped member as indicated by the numeral 102 and the transverse support plate 44 is in the form of downwardly inclined straps 104.

When using the invention to install a vehicle door, the bar 92 is employed and the vehicle door is supported with the lower edge thereof engaging the ribbed members 56 on the horizontal legs 48 and 50 which are in the form of horizontal support arms. The hooks 82 are engaged over the top edge of the door either by insertion through the window and engaging the edge of the door from the outside or by engagement from the inside with the chain 64 being tightened by virtue of the winch drum 62 thus rigidly securing the door 14 in position. The swivelly mounted bar 92 will engage the inner surface of the door for orientating the door properly and for providing stabilization to the central part of the door.

When the device is to be employed for holding a bumper in position for installation, the winch 62 is rotated until the transverse bar 74 is substantially adjacent the legs 48 and 50 and in this condition, the hooks 82 are engaged with the top edge of the bumper with the lower edge of the bumper engaging the ridged cover 56 on the legs 48 and 50. By continuous tightening of the drum 62, the bumper 12 will be rigidly secured to the tool between the hook members 82 and the supporting legs 48 and 50.

By virtue of the tubular construction, the device is relatively light weight and inexpensive to manufacture and the entire assembly is movable in a manner that will appear obvious upon a consideration of the rollers 24 or casters with which the device may be provided. If it is desired to elevate the door or the bumper, it is only necessary to operate the jack handle 34 to move the components either vertically upwardly or downwardly and if lateral movement is required, then the entire stand or tool may be moved by exerting force in the direction desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a portable tool for holding vehicle components for installation comprising a wheeled base, a vertically extending standard carried by the base, and a vertically movable support member carried by the vertically extending standard, the improvement wherein the support member is of U-shape and comprises a pair of horizontally extending support legs adapted to engage the lower edge of a vehicle component, and a winch drum rotatably mounted on the support member beneath and between said horizontally extending support legs, with a flexible tension element connected at one end to said drum and at the other end to a bar having a hook carried thereby and adapted to engage the upper edge of a vehicle component.

2. In a portable holder for a work piece, a base having ground-engaging rollers thereon, a vertically extending standard secured to said base, a friction type jack mounted for vertical movement on said vertical standard, a sleeve slidably mounted on said vertical standard above said jack, a rigid U-shaped support carried by said jack and including a pair of open, parallel and horizontally disposed legs interconnected by a curved web, with the web secured to said jack, a pliable, ribbed, work-engaging covering on said parallel legs, a winch drum carried by said jack and journaled for rotation beneath and intermediate said parallel legs of said U-shaped support, a flexible tension element connected at one end to said winch drum whereby rotation of said drum is effective to tension said flexible tension element, a ratchet operably connected to said drum for locking the same against rotation, the other end of said tension element being connected to an elongated bar carrying a hook adapted to engage the upper edge of a work piece, and said sleeve carrying a swivel bridge plate having portions engageable with an intermediate portion of a work piece for stabilizing the same when the work piece is supported at a lower edge on said horizontal legs of said U-shaped support and the top edge is engaged by said hook carried by said elongated bar and pulled downwardly by said tension element.

3. In a portable holder for a work piece, a base comprising three tubular legs extending in tripod fashion from a central hub, ground engaging rollers carried by said tubular legs, a vertically extending standard secured to said central hub, a friction jack mounted for vertical movement on said vertical standard, a sleeve slidably mounted on said vertical standard above said jack, a rigid U-shaped support fixedly secured to said jack and including a pair of horizontally disposed legs interconnected by a web, with the web connected to said jack, a pliable, ribbed, work piece-engaging covering on said horizontal legs, a winch drum carried by said jack and journaled for rotation beneath and intermediate said legs of said U-shaped support, a flexible tension element connected at one end to said winch drum whereby rotation of said drum is effective to wrap said tension element thereon, means carried by said jack for locking said drum against rotation, the other end of said tension element being connected to a work piece-engaging hook, and said sleeve carrying an adjustably positionable work piece stabilizing member engageable with an intermediate portion of a work piece for stabilizing the same when the work piece is supported at a lower edge on said horizontal legs of said U-shaped support and the top edge is engaged by said hooks and biased toward said legs by said tension element.

4. In a portable holder for a work piece, a base comprising three tubular legs extending in tripod fashion from a central hub, ground engaging rollers carried by said tubular legs, a vertically extending tubular standard secured to said base, a jack mounted for vertical movement on said vertical tubular standard, a rigid U-shaped support fixedly secured to said jack and including a pair of horizontally disposed legs interconnected by a web with the web connected to said jack, a pliable work piece-engaging covering on said horizontal legs, a winch drum carried by said jack and journaled for rotation beneath and intermediate said legs of said U-shaped support, a flexible tension element connected at one end to said winch drum whereby rotation of said drum is effective to wrap said tension element thereon, means carried by said jack for locking said drum against rotation, and the other end of said tension element being connected to a work piece-engaging hook, whereby a work piece can be supported at a lower edge on said horizontal legs of said U-shaped support and held rigidly thereon by engagement of the top edge with said hook when said drum is rotated and locked to tighten said tension element.

References Cited in the file of this patent

UNITED STATES PATENTS

| | | |
|---|---|---|
| 729,418 | Robertson | May 26, 1903 |
| 1,029,823 | Richardson | June 18, 1912 |
| 1,331,938 | McConnell et al. | Feb. 24, 1920 |
| 1,653,326 | Welter | Dec. 20, 1927 |
| 2,053,699 | Coates | Sept. 8, 1936 |
| 2,559,028 | Oberwegner | July 3, 1951 |
| 2,622,746 | Campling | Dec. 23, 1952 |
| 2,663,929 | Carpenter | Dec. 29, 1953 |

FOREIGN PATENTS

| | | |
|---|---|---|
| 4,598 | Great Britain | Mar. 14, 1891 |